S. G. SILBERMAN.
CHAIN FOR PNEUMATIC TIRES.
APPLICATION FILED JULY 29, 1915.
1,194,433.
Patented Aug. 15, 1916.
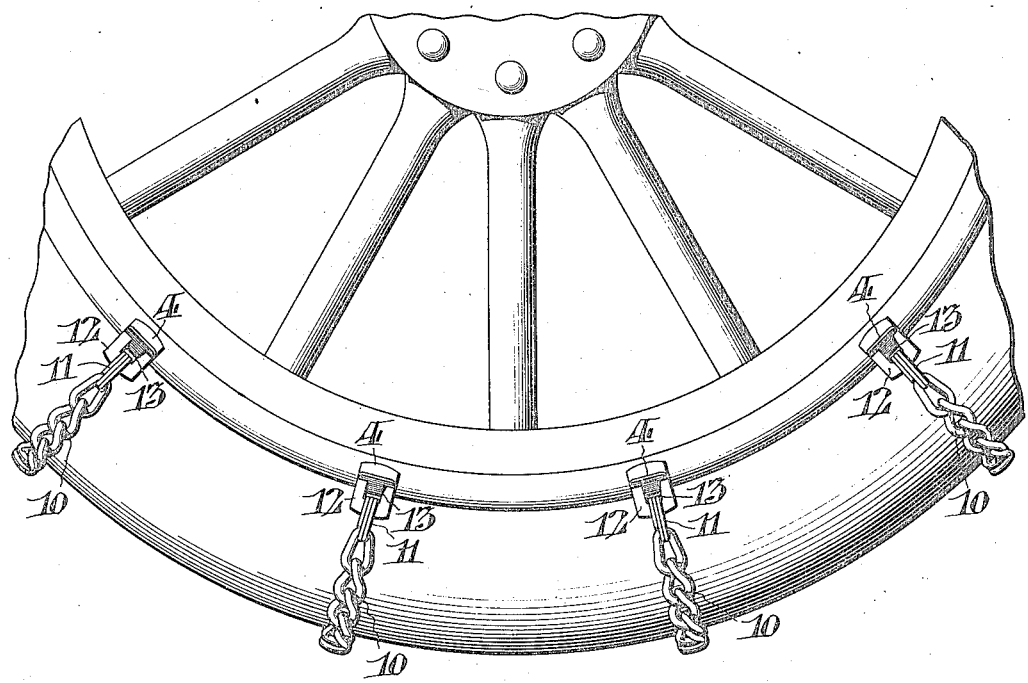
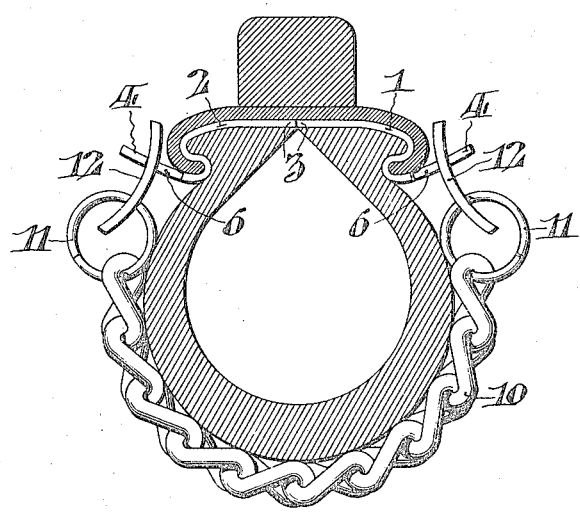
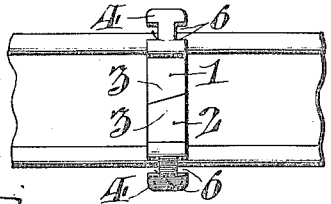
Witnesses
John C. Bergner
James H. Bell
Inventor
Samuel G. Silberman,
By Riley & Paul,
Attorneys

UNITED STATES PATENT OFFICE.

SAMUEL G. SILBERMAN, OF PHILADELPHIA, PENNSYLVANIA.

CHAIN FOR PNEUMATIC TIRES.

1,194,433.

Specification of Letters Patent.

Patented Aug. 15, 1916.

Application filed July 29, 1915. Serial No. 42,473.

*To all whom it may concern:*

Be it known that I, SAMUEL G. SILBERMAN, of Philadelphia, in the county of Philadelphia and State of Pennsylvania, have invented certain new and useful Improvements in Chains for Pneumatic Tires, whereof the following is a specification, reference being had to the accompanying drawings.

My invention relates to chains designed to prevent skidding, and applicable to the ordinary pneumatic tires of automobiles and similar self-propelled vehicles.

According to my invention I provide such chains with means for their ready and rapid attachment to, or removal from, the wheel, so that but a few moments are consumed in making these changes. To this end I insert an attachment piece between the rim and the tire, with means for readily attaching to it the ends of the chains.

In the accompanying drawings, Figure I, is an elevation of a portion of a wheel provided with chains embodying my invention. Fig. II, is a cross section of the tire of the wheel, illustrating the method of attaching of the chain, and Fig. III, is a plan view of a portion of the rim of the wheel and the attachment piece.

The attachment piece consists preferably of paired metal plates 1, 2, fitting against each other and lying within the groove of the rim. Each of the plates 1, 2, has a beveled edge 3, for abutment against its fellow, while the rest of the plate fits against the inner surface of the rim, curving to conform to its curvature, and with its ends turned out in the form of lugs 4, which project beyond the sides of the rim as shown in Fig. II. These lugs are notched as at 6.

The chains 10, of which each wheel is provided with a convenient number, are provided at their extremities with terminal attachment links 12, which may be connected to the other links of the chain by the interposition of coiled links 11. The attachment links 12, have an elongated central aperture 13, which permits the link when turned sidewise to pass over the end of the lug 4, whereupon the turn of the link due to the pressure of the rubber tire against the chain, effects a secure engagement with the lug. The coiled links 11, serve the purpose of facilitating the requisite elastic expansion of the chain to secure the attachment links to the lugs and to hold the chains in place when thus attached. The inward curvature of the attachment links 12, renders them slightly elastic and facilitates their attachment to and disengagement from the lugs.

It will be noted that the insertion of the attachment pieces within the groove of the rim may be very quickly accomplished by sliding the paired pieces until their beveled opposing edges wedge each other in place. When thus laid across the groove of the rim, they in no wise interfere with the attachment of the rubber tire to it.

It is obvious that minor changes in the details of construction and the form of the parts may be made without departing from the spirit of the invention as set forth in the appended claims.

Having thus described my invention, I claim:

1. A device for attaching chains to wheels having pneumatic tires, which consists of attachment pieces inserted transversely across the groove of the rim, and held between the rim and the tire, the ends of each attachment piece projecting at the sides of the rim, chains corresponding one to each attachment piece, and means for detachably securing the ends of the chain to the ends of the attachment piece.

2. A device for attaching chains to wheels having pneumatic tires, which consists of attachment pieces inserted between the rim and the tire projecting at the sides of the rim in the form of notched lugs, and chains corresponding one to each attachment piece, the terminal links whereof are formed so as to be readily secured to said notched lugs.

3. A device for attaching chains to wheels having pneumatic tires, which consists of attachment pieces projecting at the sides of the rim in the form of notched lugs, chains corresponding one to each attachment piece, terminal links adapted to securely engage said attachment pieces when in their normal radial position, and to pass over the end of said pieces when turned from said position, and elastic links connecting said terminal links to said chains, whereby said end pieces are normally held in their normal radial position.

4. A device for attaching chains to wheels having pneumatic tires which consists of attachment pieces inserted transversely across the groove of the rim, and lying between the rim and the tire, said attachment pieces comprising paired plates with beveled abutting surfaces whereby each plate may be wedged against its fellow, the ends of each attachment piece projecting at the sides of the rim, and chains with means for attaching
5 the terminal links of the chains to the projecting ends of the attachment pieces.

In testimony whereof, I have hereunto signed my name, at Philadelphia, Pennsylvania, this twenty-eighth day of July 1915.

SAMUEL G. SILBERMAN.

Witnesses:
JAMES H. BELL,
E. L. FULLERTON.